July 21, 1953        A. F. SMITH        2,646,289
MOUNT FOR TRAILER HITCHES
Filed July 25, 1952
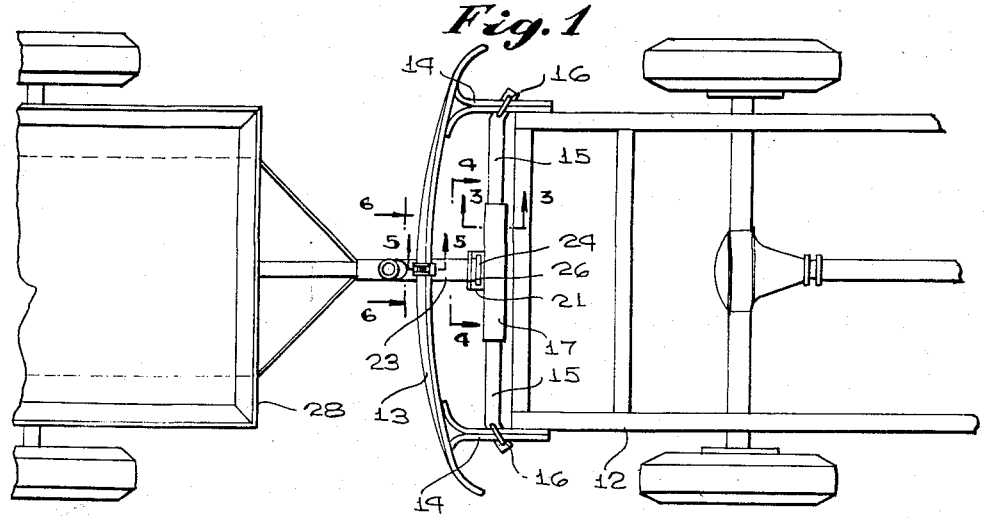
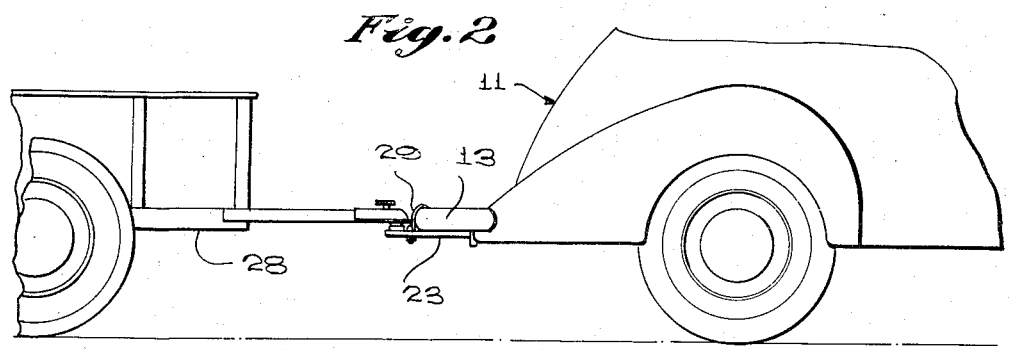
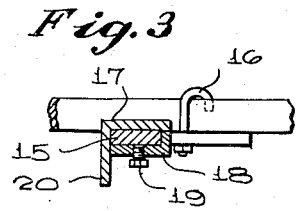
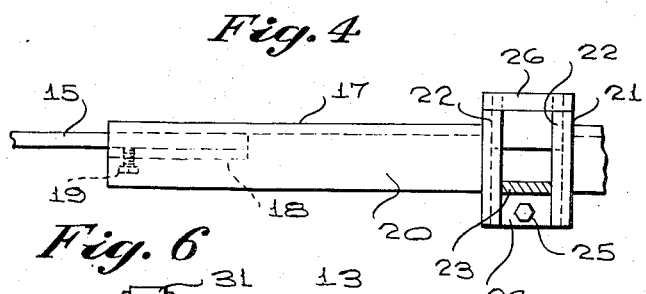
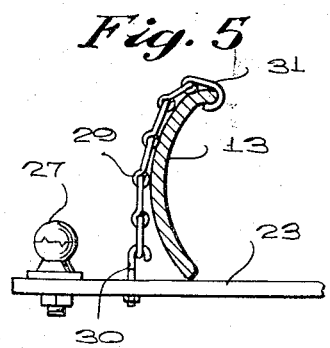
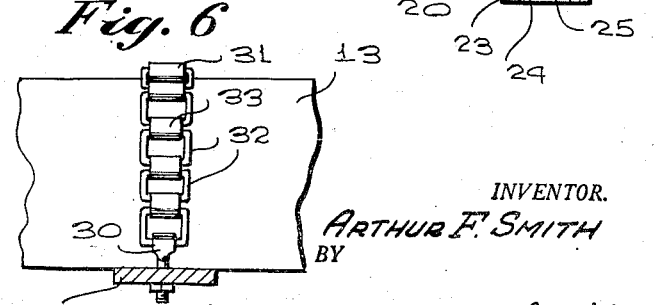
INVENTOR.
ARTHUR F. SMITH
BY
McMorrow, Berman + Davidson
ATTORNEYS Patented July 21, 1953

2,646,289

UNITED STATES PATENT OFFICE 2,646,289

MOUNT FOR TRAILER HITCHES

Arthur F. Smith, Trenton, N. J.

Application July 25, 1952, Serial No. 300,818

2 Claims. (Cl. 280—33.44)

This invention relates to mounts or brackets for detachably connecting a trailer hitch to a motor vehicle, and more particularly to an improved mount of the type which is detachably connected to the rear bumper brackets of a motor vehicle, whereby to relieve the bumper of excessive strains incident to the towing of a trailer.

A main object of the invention is to provide a novel and improved mount for a trailer hitch for an automobile having a rear bumper, the improved mount being simple in construction, being easy to install, and being adjustable in accordance with the design of the trailer and the specific construction of the bumper and its supporting brackets.

A further object of the invention is to provide an improved mount for a trailer hitch which is adapted to be supported by the rear bumper brackets of a motor vehicle, the improved mount being inexpensive to manufacture, being sturdy in construction, and providing a stable support for the trailer hitch bar.

Further objects and advantages of the invention will become apparent from the following description and claims, and from the accompanying drawings, wherein:

Figure 1 is a top view of the rear portion of an automobile chassis and a portion of a trailer which is connected to the automobile chassis by means of an improved trailer hitch mount constructed in accordance with the present invention.

Figure 2 is a side elevational view of the portions of the automobile and trailer illustrated in Figure 1, including the trailer hitch mount structure.

Figure 3 is an enlarged cross sectional detail view taken on the line 3—3 of Figure 1.

Figure 4 is an enlarged cross sectional detail view taken on the line 4—4 of Figure 1.

Figure 5 is an enlarged cross sectional detail view taken on the line 5—5 of Figure 1.

Figure 6 is an enlarged cross sectional detail view taken on the line 6—6 of Figure 1.

Referring to the drawings, 11 designates an automobile of conventional construction, said automobile having the usual chassis 12. Designated at 13 is the rear bumper which is secured to the rear corner portions of the chassis 12 by the longitudinally extending bumper brackets 14, 14 located on the opposite sides of the chassis 12, as shown in Figure 1.

Designated at 15, 15, are respective flat bar members which are secured, as by hook bolts 16, 16 to the respective bumper brackets 14, 14.

As shown in Figure 1, the flat bar members 15, 15 extend transversely and are located adjacent the rear end of the chassis 12. The flat bar members 15 are received in the respective end portions of a transverse angle bar 17, said angle bar being provided with the sleeved end portions 18, 18 in which the inner ends of the bars 15, 15 are engaged, said sleeved end portions being provided with clamping screws 19, as shown in Figures 3 and 4 which are threaded through the bottom walls of the sleeved portions 18 and which clampingly engage the bottom surfaces of the bars 15, 15 to lock said bars rigidly relative to the angle bar 17. The angle bar 17 is provided with the vertical depending flange 20, and secured to the intermediate portion of the flange 20 is the vertical rearwardly facing guide channel 21, said channel being provided with the inturned flanges 22, 22. The inturned flanges 22, 22 define with the remainder of the vertical channel 21, a T-shaped groove. Designated at 23 is the rearwardly extending hitch bar which is adapted to underlie the bumper 13, as shown in Figure 5. Secured to the hitch bar 23 is the vertical, generally rectangular plate member 24 which is slidably received in the vertical member 21. Threadedly engaged through the lower portion of the plate member 24 is a clamping screw 25 which is clampingly engageable with the inside wall surface of the channel member 21 to lock the hitch bar 23 in vertically adjusted position with respect to said channel member. Secured to the top portions of the inturned flange elements 22, 22 is the transversely extending stop bar 26 which serves to limit vertical movement of the hitch bar 23 and which prevents the hitch bar 23 from becoming disengaged from the channel member 21.

The hitch bar 23 is provided at its rearward end with the conventional trailer hitch ball 27 adapted to be engaged in the trailer hitch socket provided on the trailer, shown at 28, and adapted to be locked therein in the usual manner.

As shown in Figure 5, the hitch bar 23 is adapted to underlie the bumper 13 and is securely fastened thereto by a chain 29 provided at one end with a hook bolt 30 which is engaged with the hitch bar 23 and provided at its opposite end with a hook 31 which is engaged with the top edge of the bumper 13. The chain 29 comprises the rectangular links 32 which are pivotally connected together by the sleeve elements 33, as shown in Figure 6. By the employment of the rectangular links 32, the chain 29 is secured firmly against the surface of the bumper 13 and cannot rotate, thus insuring a stable connection of the hitch bar 23 to the bumper. The hook 31 is of a width substantially equal to the width of the sleeve elements 33, whereby a secure gripping action is obtained on the top edge of the bumper 13.

It will be readily apparent that the bar members 15, 15 may be easily adjusted to conform with the spacing between the bumper brackets 14, 14 on the vehicle on which the trailer hitch mount is to be installed. It will also be readily apparent that the hitch bar 23 may be adjusted vertically relative to the angle bar 20 so as to abut the bottom edge of the rear bumper 13, whereby it may be secured to the bumper by the chain 29, as above described. The hitch bar 23 may be rigidly locked in adjusted position relative to angle bar 17 by tightening the clamping screw 25. Similarly, the bar members 15 may be locked relative to the angle bar 17 by tightening the clamping screw 19, 19. It is thus apparent that the hitch mount is universally adjustable to a wide range of automobile designs and affords a secure and reliable connection of the hitch bar to the rear portion of the automobile chassis.

While a specific embodiment of an improved mount for an automobile trailer hitch has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A mount for a trailer hitch for an automobile having a rear bumper and laterally spaced bumper brackets connecting said bumper thereto in rearwardly spaced relation, said mount comprising a pair of bar members adapted to extend between said brackets, means detachably connecting said bar members to said brackets, a sleeve element slidably receiving said bar members, clamping means on said sleeve element lockingly engageable with said bar members, a rearwardly directed hitch member, a transverse head element rigidly secured to said hitch member, a vertical guide on said sleeve element slidably receiving said head element for vertical adjustment in said guide, a clamping member on said head element lockingly engageable with said guide to secure the hitch member in vertically adjusted position, said hitch member being adapted to underlie said rear bumper, and a clamping member secured to said hitch member and being formed to lockingly engage the top edge of the bumper.

2. A mount for a trailer hitch for an automobile having a rear bumper and laterally spaced bumper brackets connecting said bumper thereto in rearwardly spaced relation, said mount comprising a pair of bar members adapted to extend between said brackets, means detachably connecting said bar members to said brackets, a sleeve element slidably receiving said bar members, clamping means on said sleeve element lockingly engageable with said bar members, a rearwardly directed hitch member, a transverse head element rigidly secured to the hitch member, a vertical guide on said sleeve element slidably receiving said head element for vertical adjustment in said guide, a clamping member on said head element lockingly engageable with said guide to secure the hitch member in vertically adjusted position, a transverse stop bar secured on said vertical guide and limiting vertical movement of the hitch member in the guide, said hitch member being adapted to underlie said rear bumper, a chain secured to said hitch member, and a hook secured to said chain and being formed to lockingly engage the top edge of the bumper.

ARTHUR F. SMITH.

References Cited in the file of this patent

UNITED STATES PATENTS

| Number | Name | Date |
| --- | --- | --- |
| 1,779,192 | Signer | Oct. 21, 1930 |
| 2,549,941 | Smith | Apr. 24, 1951 |
| 2,554,711 | Lowman | May 29, 1951 |